United States Patent
Chin et al.

(10) Patent No.: US 8,347,279 B2
(45) Date of Patent: Jan. 1, 2013

(54) BASE APPLICATION AND STACK APPLICATION SYNCHRONIZATION FOR SOFTWARE INSTALLATION AND MAINTENANCE

(75) Inventors: Howard Chun Chin, North York (CA); Teresa C. Kan, Rochester, MN (US); Manquing Li, Nepean (CA); Edward Mischkot, Brampton (CA); Ying Choi So, North York (CA)

(73) Assignee: International Business Machines Corporation, Armonk, NY (US)

( * ) Notice: Subject to any disclaimer, the term of this patent is extended or adjusted under 35 U.S.C. 154(b) by 1803 days.

(21) Appl. No.: 11/759,680

(22) Filed: Jun. 7, 2007

(65) Prior Publication Data
US 2008/0307405 A1 Dec. 11, 2008

(51) Int. Cl.
*G06F 9/45* (2006.01)
(52) U.S. Cl. .......................................... 717/168
(58) Field of Classification Search ................... 717/168
See application file for complete search history.

(56) References Cited

U.S. PATENT DOCUMENTS
2006/0036652 A1* 2/2006 Cope et al. ................ 707/200

* cited by examiner

*Primary Examiner* — John Chavis
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to dependency maintenance when updating a base application and provide a method, system and computer program product for base and stack application dependency synchronization when updating the base application. In one embodiment of the invention, a method for base and stack application dependency synchronization can be provided for when updating the base application in a multi-application software system. The method can include separating an update to the multi-application software system into a core update for a base application in the multi-application software system and multiple different anchors, each anchor corresponding to at least one stack application. The method further can include installing the core update to the base application and only those of the anchors corresponding to those of the stack applications installed for the base application.

17 Claims, 3 Drawing Sheets

BASE APPLICATION AND STACK APPLICATION SYNCHRONIZATION FOR SOFTWARE INSTALLATION AND MAINTENANCE

BACKGROUND OF THE INVENTION

1. Field of the Invention

The present invention relates to the field of software application installation and more particularly to maintaining application dependencies in a system of base and stack applications.

2. Description of the Related Art

Though often overlooked, application installation is a prerequisite to interacting with a software application. Specifically, in most circumstances, an application can be properly executed only subsequent to the completion of a successful installation process. At the minimum, a typical software application installation requires a transfer of files to the file structure of a computing system, and the configuration of the computing system to particularly interact with the software application. Ordinarily, the configuration of the computing system includes the addition or modification of registry settings, the addition or modification of entries to one or more initialization files, or both.

Typically, software programs include as a component installer logic having program code enabled to substantially automate the installation process. In addition, computer operating systems occasionally incorporate installer logic for use in installing drivers or other software. Likewise, many commercial software offerings are provided with companion updater logic supporting self-updating operations. Generally, the updater logic can be included as a component of the software program itself, or the updater logic can be provided externally as a third-party tool.

The provision of an updating process is desirable because software programs are frequently modified by end users, for example by applying bug fixes or enhancements (such as new versions of the software). There are many different processes for installing and/or updating software programs. Some processes are entirely automated and substantially invisible to the user, while other processes are better characterized as interactive. Some processes are known to be complex while other processes are viewed to be simpler in nature. Of importance, the updating of a single application can be simple in nature, whereas the updating of an application upon which other applications depend can be complex in that subtle changes in the composition of the updated application can break the operation of those dependent applications.

In this regard, in a software system of multiple different installed applications, complex dependencies can exist between the applications. The installation of a service or maintenance update to a base application for which other software applications depend, hereinafter referred to as "stack applications", can corrupt the stack applications and cause one or more of the stack applications to fail. Traditional installers only validate dependency prerequisite checking during an initial installation process. Thereafter, no further checking or action is taken to maintain dependencies even if service applied to the base application invalidates dependency relationships causing other stack applications to fail.

BRIEF SUMMARY OF THE INVENTION

Embodiments of the present invention address deficiencies of the art in respect to dependency maintenance when updating a base application and provide a novel and non-obvious method, system and apparatus for base and stack application dependency synchronization when updating the base application. In one embodiment of the invention, a method for base and stack application dependency synchronization can be provided for when updating the base application in a multi-application software system. The method can include separating an update to the multi-application software system into a core update for a base application in the multi-application software system and multiple different anchors, each anchor corresponding to at least one stack application. The method further can include installing the core update to the base application and only those of the anchors corresponding to those of the stack applications installed for the base application.

In one aspect of the embodiment, the method also can include selecting a new stack application for installation with the base application, identifying a maintenance level of the base application and a requisite maintenance level of the base application to support the stack application, updating the base application to the requisite maintenance level if the identified maintenance level differs from the requisite maintenance level, installing an anchor for the new stack application, and installing the new stack application with the base application. In another aspect of the embodiment, the method also can include updating the base application, identifying each stack application installed with the base application, and replacing each anchor for each identified stack application with a new anchor for each identified stack application, the new anchor supporting the updated base application. Finally, in yet another aspect of the embodiment, the method also can include selecting a previous maintenance level to demote the base application from a current maintenance level, uninstalling all anchors associated with the current maintenance level, demoting the base application to the previous maintenance level, and installing new anchors associated with the previous maintenance level. However, the demotion can be aborted if the current maintenance level is a minimum necessary to support any of the stack applications.

In another embodiment of the invention, an installation data processing system can be provided for installing updates to a multi-application software system. The system can include an installation server, an update to the multi-application software system including a core update for a base application in the multi-software system bundled separately from a plurality of anchors. Each anchor can correspond to a different stack application in the multi-software system. Finally, the system can include dependency synchronization logic executing in the installation server. The logic can include program code enabled to install the core update to the base application and only those of the anchors corresponding to a stack application installed for the base application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for base and stack application dependency synchronization when updating the base application in a multi-application software system. In accordance with an embodiment of the present invention, a bundle of maintenance files for updating a base application can be separated into maintenance files required by the base application and maintenance files required to support stack applications dependent upon the base application. The latter set of files, referred to herein as an anchor, can be applied to the base application only where a corresponding stack application depends upon the base application. Otherwise, the anchor for a stack application can be excluded for installation. The installation of an anchor for a stack application can occur when installing the stack application, when updating the base application to a new maintenance level, when demoting the base application to an earlier maintenance level and when uninstalling the base application.

Figure 1:
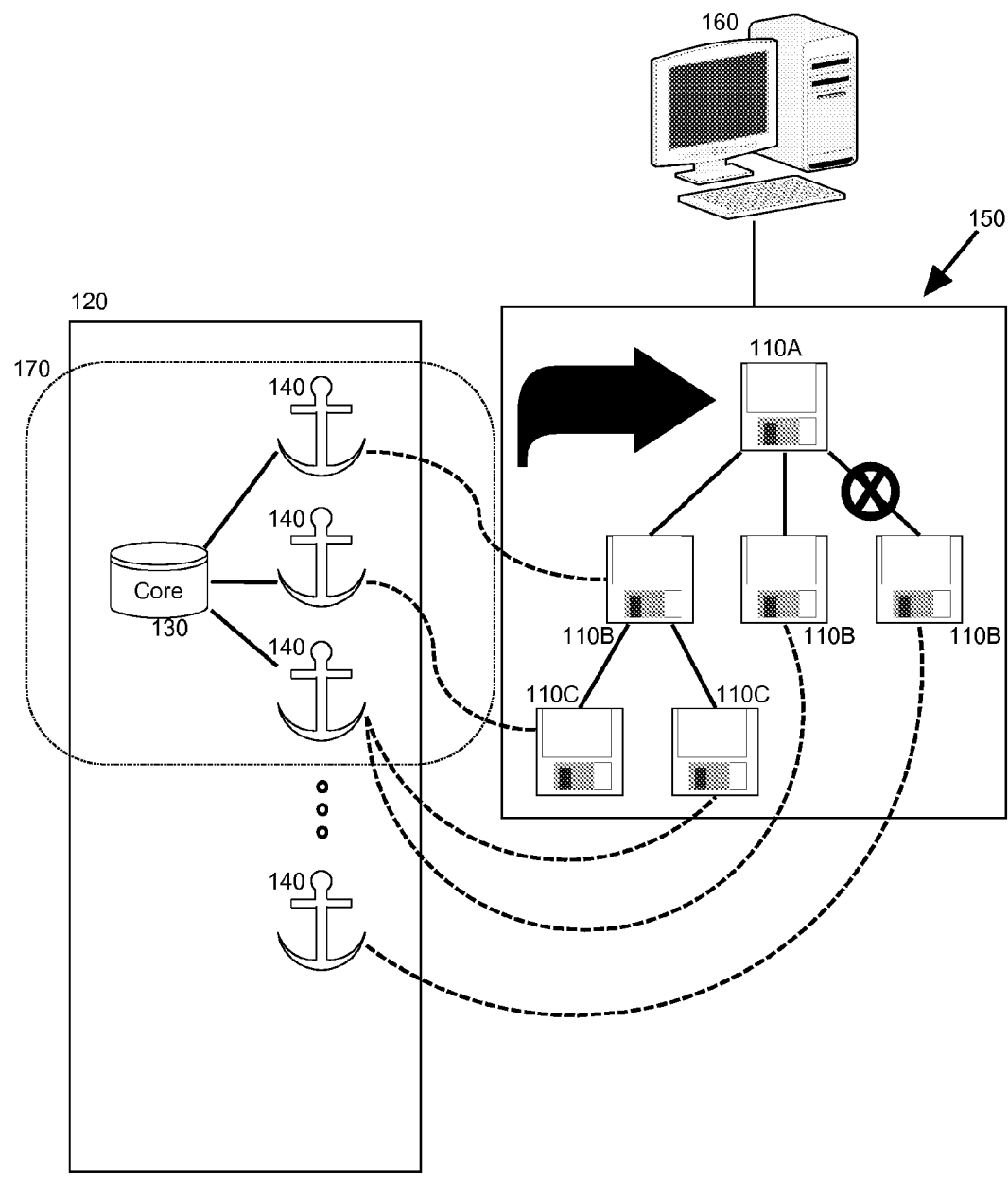
FIG. 1 is a pictorial illustration of a software updating system configured for base and stack application dependency synchronization when updating the base application in a multi-application software system.

In illustration, FIG. 1 depicts a software updating system configured for base and stack application dependency synchronization when updating the base application in a multi-application software system. As shown in FIG. 1, a host computing platform 160 which can include one or more computing systems and one or more computing process execution sessions within the computing systems can support the operation of a multi-application software system 150. The multi-application software system 150 can include a base application 110A and one or more dependent, stack applications 110B augmenting the functionality of the base application 110A. The base application 110A can be enabled to execute without the assistance of the stack applications 110B, though it is to be recognized that the stack applications 110B depend upon the operation of the base application 110A. It is to be further recognized that additional stack applications 110C can depend upon the presence of a given one of the stack applications 110B.

A bundle of maintenance files 120 can be provided for updating the multi-application software system 150. The bundle of maintenance files 120, however, can be separated into core files 130 for updating only the base application 110A, and one or more anchors 140, each corresponding to one or more different one of the stack applications 110B, 110C. Each anchor 140 can provide interface logic enabling the extension of the base application 110A to provide for the functionality and interface provided by a corresponding one of the stack applications 110B, 110C. When installing a given one of the stack applications 110B, 110C for use with a base application 110A, a corresponding one of the anchors 140 also can be installed. Likewise, when uninstalling a given one of the stack applications 110B, 110C from use with the base application 110A, a corresponding one of the anchors 140 also can be uninstalled so long as the corresponding one of the anchors 140 is not commonly required by a still installed one of the anchors 140.

In this regard, a single one of the anchors 140 can provide the enabling logic in the base application 110A that allows two or more of the stack applications 110B, 110C to provide the extended functionality in the application software system 150. As such, when installing a stack application 110B, 110C, a correspondent one of the anchors 140 need be installed only if not already installed for another of the stack applications 110B, 110C. Likewise, when uninstalling one of the stack applications 110B, 110C, the correspondent one of the anchors 140 will not be uninstalled as well if others of the stack applications 110B, 110C remain installed and share the correspondent one of the anchors 140 with the uninstalled one of the stack applications 110B, 110C.

Each of the anchors 140 can be bundled with the core files 130 for updating the multi-application software system 150. As such, the base application 110A essentially "owns" the anchors 140 in that the choice of which version of the different anchors 140 are to be installed and which anchors 140 are to be excluded from installation is determined in accordance with the base application 110A. Similarly, the responsibility for determining when to update installed ones of the anchors 140 rests with base application 110A. To that end, when updating the base application 110A to a new maintenance level provided by the core files 130, an updated one of the anchors 140 for each installed one of the stack applications 110B, 110C further can be installed while others of the anchors 140 corresponding to uninstalled ones of the stack applications 110B, 110C can be excluded from installation.

Figure 2:
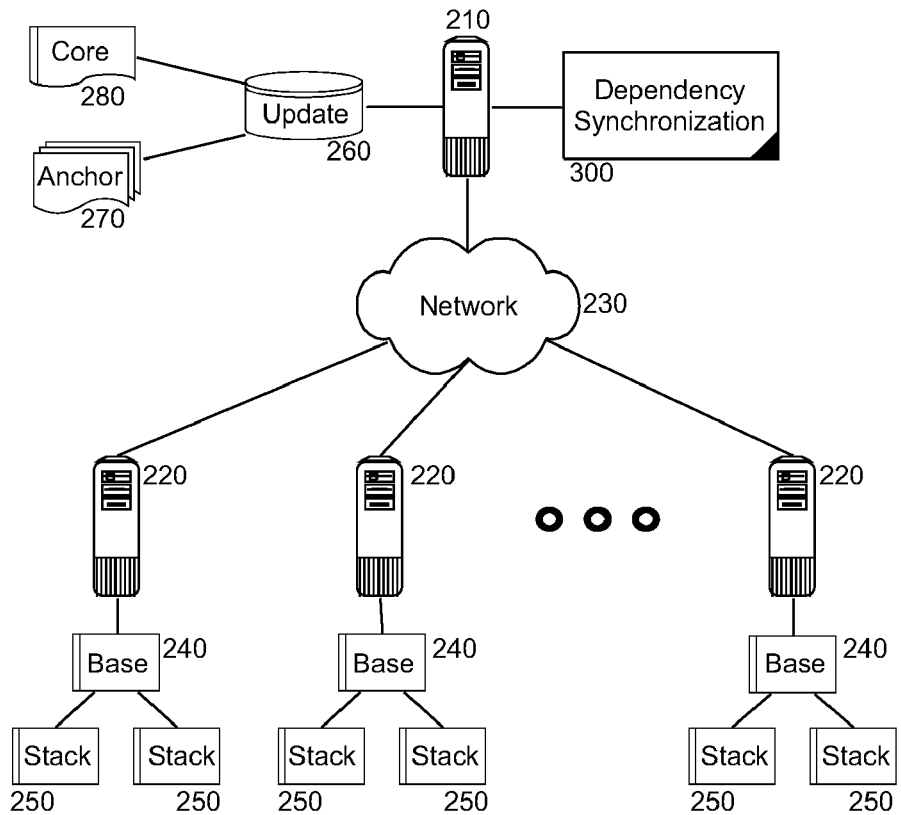
FIG. 2 is a schematic illustration of a software updating system configured for base and stack application dependency synchronization when updating the base application in a multi-application software system.

In further illustration, FIG. 2 is a schematic illustration of a software updating system configured for base and stack application dependency synchronization when updating the base application in a multi-application software system. The system can include an installation server 210 configured for communicative coupling to one or more target hosts 220 over computer communications network 230. Each of the target hosts 220 can support the execution of a multi-application software system including a base application 240 and one or more stack applications 250. The installation server 210 can include an update registry 260 tracking dependent stack applications 250 for each corresponding base application 240 including required maintenance levels for each corresponding base application 240 to support one or more of the corresponding stack applications in the multi-application software system.

Dependency synchronization logic 300 further can be coupled to the installation server 210. The dependency synchronization logic 300 can include program code enabled to apply updates to the multi-application software system through a core update 280 to the base application 240 and a separately bundled set of anchors 270 for corresponding ones of the stack applications 250. In this regard, the program code of the dependency synchronization logic 300 can be enabled to install an anchor 270 into the base application 240 whenever a corresponding stack application is installed into the base application 240. The program code further can be enabled to update the anchor 270 whenever the base application 240 is updated. Finally, the program code can be enabled to uninstall an anchor 270 whenever a corresponding stack application 250 is uninstalled.

Figure 3A:
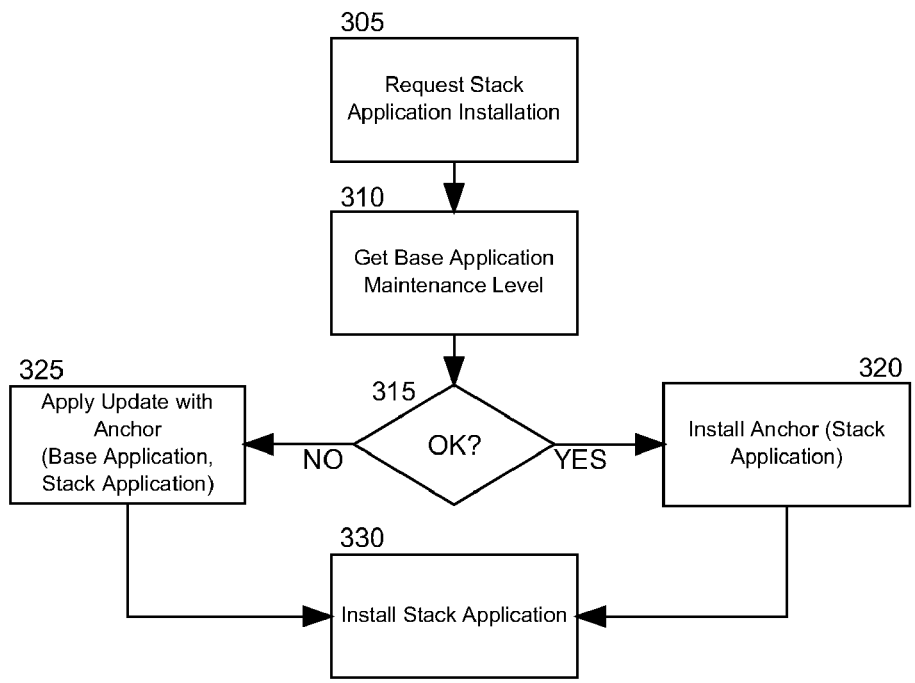
FIG. 3A is a flow chart illustrating a process for base and stack application dependency synchronization when installing a stack application onto a base application in a multi-application software system.

In illustration of the operation of the dependency synchronization logic 300, FIG. 3A is a flow chart illustrating a process for base and stack application dependency synchronization when installing a stack application onto a base application in a multi-application software system. Beginning in block 305, a request for stack application installation can be received. In block 310, a maintenance level for an associated base application can be determined and compared to a requisite maintenance level for the stack application. In decision block 315, if the base application is at a maintenance level suitable to support the stack application, in block 320 the anchor for the stack application can be installed. Otherwise, that is, if the base application is at a maintenance level different from the requisite maintenance level and is therefore unable to support the stack application, then in block 325, an update can be applied to the base application to bring it to the requisite maintenance level and the anchor for the stack application can be installed. Finally, in block 330 the stack application itself can be installed. In this way, it can be assured that the dependency relationship between stack application and base application remains consistent and supported.

Figure 3B:
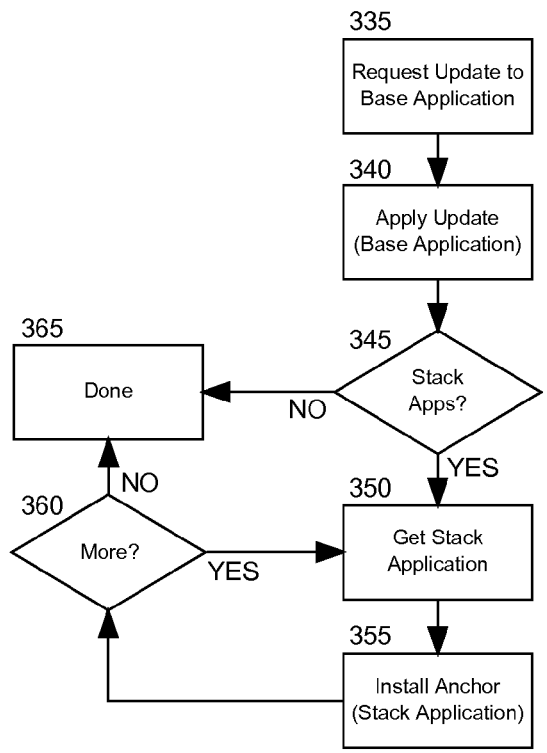
FIG. 3B is a flow chart illustrating a process for base and stack application dependency synchronization when updating a base application in a multi-application software system.

Turning now to FIG. 3B, a flow chart is shown which illustrates a process for base and stack application dependency synchronization when updating a base application in a multi-application software system. Beginning in block 335, a request to update the base application can be received. In block 340, the update can be applied to the base application bringing the base application to a new maintenance level. Thereafter, in decision block 345 it can be determined whether one or more stack applications depend upon the base application. If so, in block 350, a first stack application can be selected and an anchor for the selected stack application can be installed in block 355. In decision block 360, if additional stack applications remain to be processed, the process can repeat in block 350. When no further stack applications remain to be processed, in block 365 the process can end.

Figure 3C:
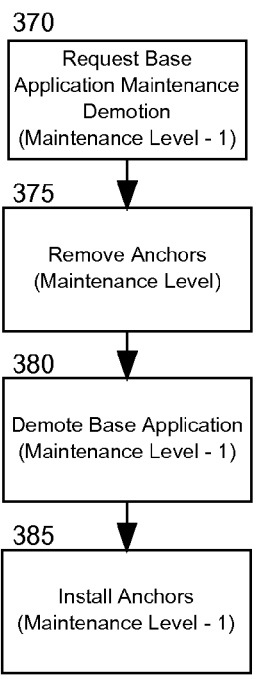
FIG. 3C is a flow chart illustrating a process for base and stack application dependency synchronization when demoting a base application from a current maintenance level to an earlier maintenance level in a multi-application software system; and, FIG. 3D is a flow chart illustrating a process for base and stack application dependency synchronization when uninstalling a stack application in a multi-application software system.

FIG. 3C is a flow chart illustrating a process for base and stack application dependency synchronization when demoting a base application from a current maintenance level to an earlier maintenance level in a multi-application software system. Beginning in block 370, a request can be received to demote the base application from a current maintenance level to a previous maintenance level. In block 375, all anchors associated with the current maintenance level of the base application can be uninstalled and in block 380, the base application can be demoted to the previous maintenance level. Finally, in block 385 anchors for the previous maintenance level can be installed to support the operation of the dependent stack applications.

Figure 3D:
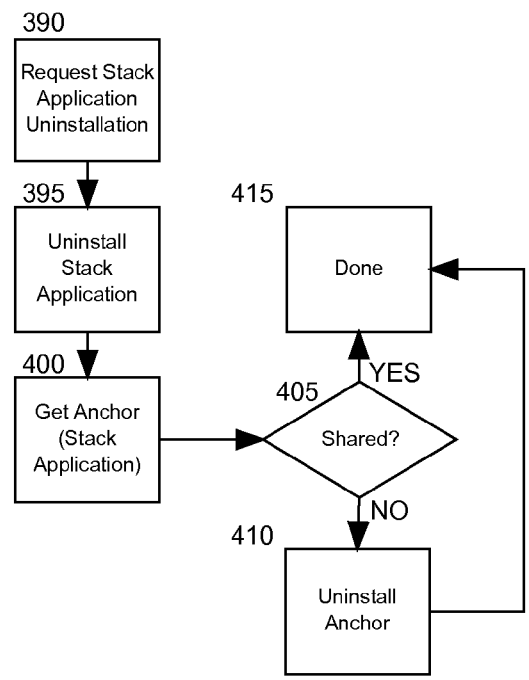

Finally, FIG. 3D is a flow chart illustrating a process for base and stack application dependency synchronization when uninstalling a stack application in a multi-application software system. Beginning in block 390, a request can be received to uninstall a stack application from the multi-application software system. In response, in block 395 the stack application can be uninstalled and in block 400, a corresponding anchor can be identified. In decision block 405 it can be determined whether other stack applications in the multi-application software system share the corresponding anchor. If not, in block 410 the corresponding anchor can be uninstalled and in block 415, the un-installation process can end.

Embodiments of the invention can take the form of an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for base and stack application dependency synchronization when updating the base application in a multi-application software system, the method comprising:

separating an update to the multi-application software system into a core update for a base application in the multi-application software system and a plurality of anchors, each anchor corresponding to at least one stack application; and, installing the core update to the base application and only those of the anchors corresponding to those of the stack applications installed for the base application.

2. The method of claim 1, further comprising:

selecting a new stack application for installation with the base application;

identifying a maintenance level of the base application and a requisite maintenance level of the base application to support the stack application;

updating the base application to the requisite maintenance level if the identified maintenance level differs from the requisite maintenance level;

installing an anchor for the new stack application; and, installing the new stack application with the base application.

3. The method of claim 2, wherein installing an anchor for the new stack application, comprises installing an anchor for the new stack application only if the anchor for the new stack application has not already been installed for another stack application sharing the anchor for the new stack application.

4. The method of claim 1, further comprising:
updating the base application;
identifying each stack application installed with the base application; and,
replacing each anchor for each identified stack application with a new anchor for each identified stack application, the new anchor supporting the updated base application.

5. The method of claim 1, further comprising:
selecting a previous maintenance level to demote the base application from a current maintenance level;
uninstalling all anchors associated with the current maintenance level;
demoting the base application to the previous maintenance level; and,
installing new anchors associated with the previous maintenance level.

6. The method of claim 5, further comprising aborting the demoting if the current maintenance level is a minimum necessary to support any of the stack applications.

7. The method of claim 1, further comprising:
uninstalling a stack application from the base application; and,
uninstalling a corresponding anchor from the base application.

8. The method of claim 1, further comprising:
uninstalling a stack application from the base application;
identifying a corresponding anchor for the stack application;
determining whether any other stack applications share the corresponding anchor; and,
uninstalling the corresponding anchor from the base application only if no other stack applications share the corresponding anchor.

9. An installation data processing system for installing updates to a multi-application software system, the system comprising:
an installation server;
an update to the multi-application software system comprising a core update for a base application in the multi-software system bundled separately from a plurality of anchors, each anchor corresponding to a different stack application in the multi-software system; and,
dependency synchronization logic executing in the installation server, the logic comprising program code enabled to install the core update to the base application and only those of the anchors corresponding to a stack application installed for the base application.

10. A computer program product comprising a computer usable storage medium having computer usable program code for base and stack application dependency synchronization when updating the base application in a multi-application software system, the computer program product including:
computer usable program code for separating an update to the multi-application software system into a core update for a base application in the multi-application software system and a plurality of anchors, each anchor corresponding to at least one stack application; and,
computer usable program code for installing the core update to the base application and only those of the anchors corresponding to those of the stack applications installed for the base application.

11. The computer program product of claim 10, further comprising:
computer usable program code for selecting a new stack application for installation with the base application;
computer usable program code for identifying a maintenance level of the base application and a requisite maintenance level of the base application to support the stack application;
computer usable program code for updating the base application to the requisite maintenance level if the identified maintenance level differs from the requisite maintenance level;
computer usable program code for installing an anchor for the new stack application; and,
computer usable program code for installing the new stack application with the base application.

12. The computer program product of claim 11, wherein the computer usable program code for installing an anchor for the new stack application, comprises installing an anchor for the new stack application only if the anchor for the new stack application has not already been installed for another stack application sharing the anchor for the new stack application.

13. The computer program product of claim 10, further comprising:
computer usable program code for updating the base application;
computer usable program code for identifying each stack application installed with the base application; and,
computer usable program code for replacing each anchor for each identified stack application with a new anchor for each identified stack application, the new anchor supporting the updated base application.

14. The computer program product of claim 10, further comprising:
computer usable program code for selecting a previous maintenance level to demote the base application from a current maintenance level;
computer usable program code for uninstalling all anchors associated with the current maintenance level;
computer usable program code for demoting the base application to the previous maintenance level; and,
computer usable program code for installing new anchors associated with the previous maintenance level.

15. The computer program product of claim 14, further comprising computer usable program code for aborting the demoting if the current maintenance level is a minimum necessary to support any of the stack applications.

16. The computer program product of claim 10, further comprising:
computer usable program code for uninstalling a stack application from the base application; and,
computer usable program code for uninstalling a corresponding anchor from the base application.

17. The computer program product of claim 10, further comprising:
computer usable program code for uninstalling a stack application from the base application;
computer usable program code for identifying a corresponding anchor for the stack application;
computer usable program code for determining whether any other stack applications share the corresponding anchor; and,
computer usable program code for uninstalling the corresponding anchor from the base application only if no other stack applications share the corresponding anchor.

* * * * *